R. B. LAMB,

Assignor, by mesne assignments, to THE NATIONAL UNDERGROUND ELECTRIC CO.

Underground Conduit for Telegraphic Conductors.

No. 9,745. Reissued June 7, 1881.

Witnesses,
James F. Jobin,
Harry Smith

Inventor:
Rastor B. Lamb
by his Attorneys
Howson and Sons

N. PETERS, Photo-Lithographer, Washington, D. C.

UNITED STATES PATENT OFFICE.

RESTORE B. LAMB, OF CAMDEN, N. J., ASSIGNOR, BY MESNE ASSIGNMENTS, TO THE NATIONAL UNDERGROUND ELECTRIC COMPANY, OF SAME PLACE.

UNDERGROUND CONDUIT FOR TELEGRAPHIC CONDUCTORS.

SPECIFICATION forming part of Reissued Letters Patent No. 9,745, dated June 7, 1881.

Original No. 229,259, dated June 29, 1880. Application for reissue filed May 13, 1881.

*To all whom it may concern:*

Be it known that I, RESTORE B. LAMB, a citizen of the United States, residing in the city and county of Camden, and State of New Jersey, have invented a new and useful Improvement in Underground Conduits for Telegraph, Telephone, and other Wires, which improvement is fully set forth in the following specification and accompanying drawings, in which—

Figure 1:
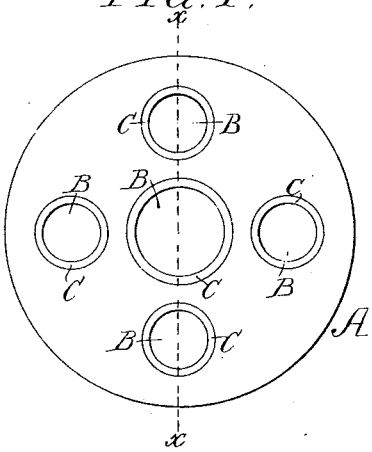
Figure 2:
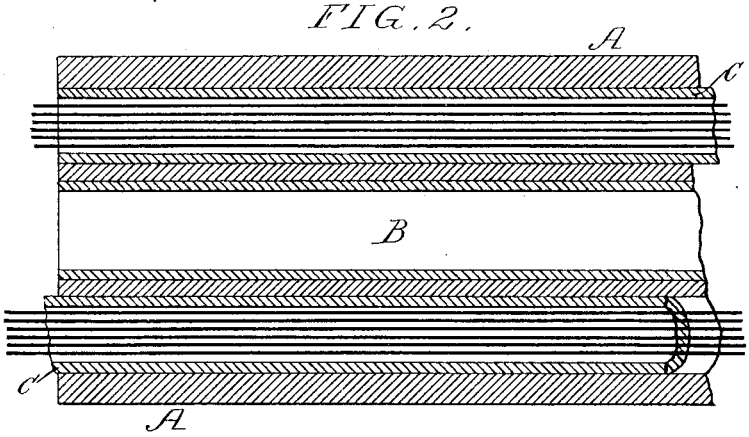
Figure 3:
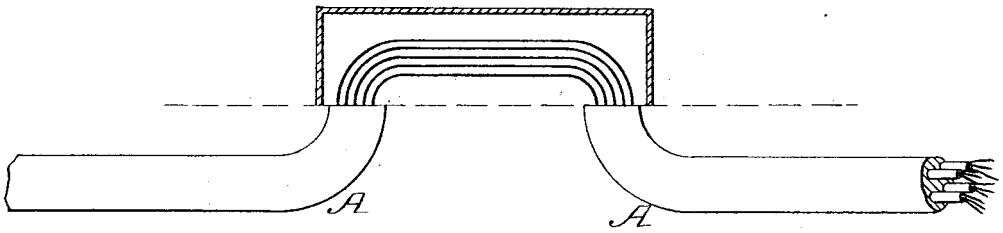

Figure 1 is an end view of the conduit. Fig. 2 is a longitudinal section on the line *x x*, Fig. 1; and Fig. 3 is a side view, showing a testing-station.

Similar letters of reference indicate corresponding parts in the several figures.

The main object of my invention is to make underground water-tight conduits for telegraph and telephone conductors; and this object I attain by combining a series of blocks or sections of terra-cotta or other like material with continuous tubes of rubber drawn through passages in said blocks, as explained hereinafter.

Referring to the drawings, A represents a section or piece of the conduit, which is formed of a block of terra-cotta or other suitable material, a series of longitudinal passages or channels, B, being formed in and extending through the said block, and containing rubber tubing C.

The sections or blocks A are laid in a suitable trench in the ground, and united one to another, the rubber tubes being drawn through the sections as the line is being built up, and the wires properly introduced through the tubes.

Suitable turn-outs or branches and testing-stations are provided, of which latter one form is shown in Fig. 3.

The passages or channels B formed in the blocks A are employed for wires of different lines, and a sufficient number of them to meet the demands of the extension of the line and other requirements.

The rubber tubing is sustained and protected from contact with the earth by the material of the surrounding block, and, owing to the nature of the tubing, water and moisture are prevented from reaching the wires, the latter thus being shielded and preserved. The tubing is continuous and of a non-absorbent nature, and retains its shape and location in the passages or channels. The wires may be readily drawn through the tubes and removed therefrom when required. The tubing also may be removed when necessary, and replaced if found defective; and should a line be abandoned the tubing may be withdrawn intact, and the blocks afterward dug out, if required for further service.

I claim as new and desire to secure by Letters Patent—

1. The within-described underground conduit for telegraph-wires, the same consisting of a series of blocks of terra-cotta or other material having separate longitudinal passages, and of continuous rubber tubes extending through the passages of a number of sections, substantially as specified.

2. The combination of the series of united blocks or sections A, each having a number of longitudinal and separate passages, with rubber tubes adapted to said passages of a number of blocks and admitting of being withdrawn therefrom, as set forth.

In testimony whereof I have signed my name to this specification in the presence of two subscribing witnesses.

RESTORE B. LAMB.

Witnesses:

JAMES F. TOBIN,

HARRY SMITH.